Oct. 21, 1952     H. E. HOLLMANN     2,614,416
FORCE MEASURING SYSTEM EMPLOYING PIEZOCAPACITORS
Filed Feb. 16, 1950
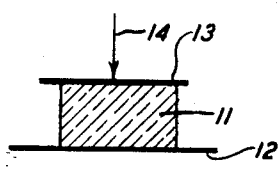
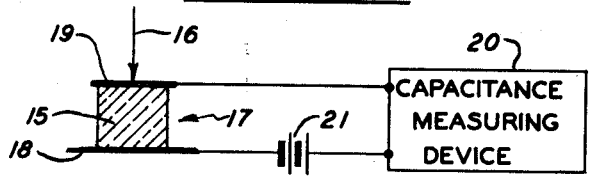
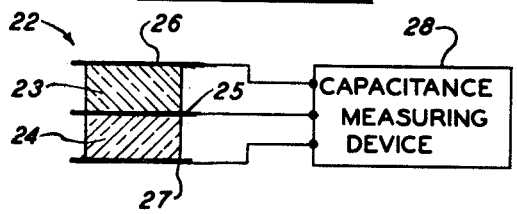
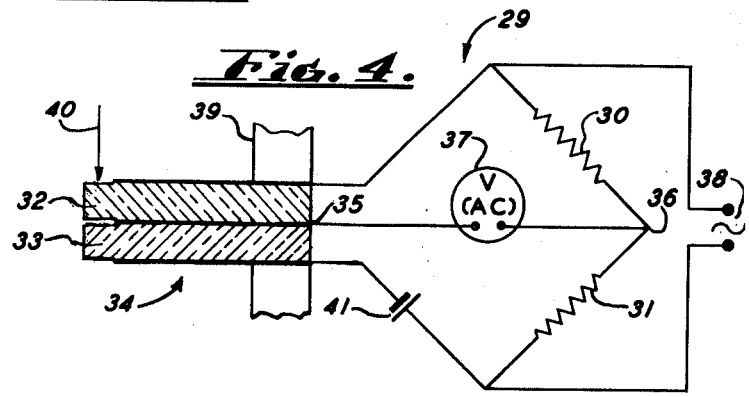
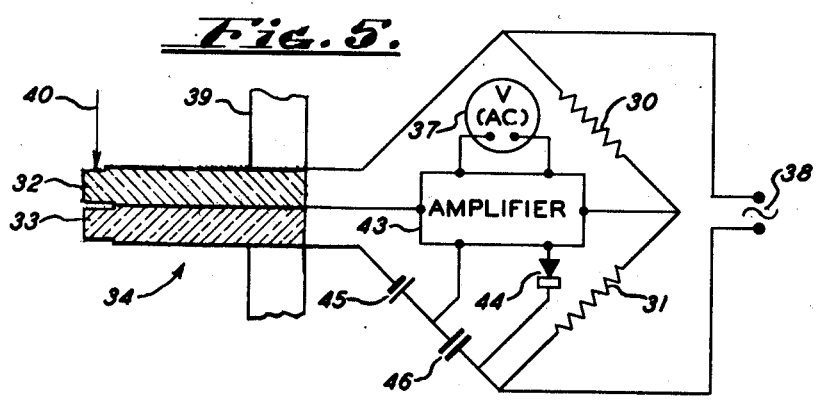
INVENTOR.
HANS E. HOLLMANN
BY
ATTORNEY Patented Oct. 21, 1952

2,614,416

UNITED STATES PATENT OFFICE 2,614,416

FORCE MEASURING SYSTEM EMPLOYING PIEZOCAPACITORS

Hans E. Hollmann, Oxnard, Calif., assignor to the United States of America as represented by the Secretary of the Navy Application February 16, 1950, Serial No. 144,568

7 Claims. (Cl. 73—133)

(Granted under the act of March 3, 1883, as amended April 30, 1928; 370 O. G. 757)

This invention relates to a piezo-capacitor, that is, a capacitor whose capacity varies with the pressure upon its dielectric medium.

It is an object of this invention to provide a new type of variable capacitor whose capacity varies markedly with the magnitude of any mechanical force applied to the dielectric within the capacitor. The capacity-varying quantity may be a displacement, acceleration, torque, bending, twisting, or other quantity translatable into a mechanical stress.

It is another object of this invention to provide new and useful force measuring systems for converting or translating into electrical quantities such mechanical quantities as force, deflection, displacements, velocity, acceleration, vibrations, and the like, all of them in the basic form of constant, fluctuating, or oscillating mechanical pressures.

It is a further object of this invention to provide a simple, compact, stable, and rugged sensing device which may be readily adapted for use in microphones, phonograph pickups, vibrometers, accelerometers, and the like.

In accordance with these and other objects which will become apparent throughout the following specification, the instant invention comprises: a capacitor having a suitable dielectric, means for subjecting the dielectric to a mechanical stress resulting in a deformation; and means for measuring the capacity of the piezo-capacitor, which I have discovered to be closely associated with the amount of stress applied to the dielectric, said means including a circuit for imposing a feedback voltage derived from the measuring operation across the dielectric to improve the sensitivity or stability of measurements whereby a sensitive sensing device is provided. It has been found that the dielectric is preferably a material exhibiting piezoelectric properties, and more particularly Seignette-electric properties, such as Rochelle salt, barium titanates and other titanates, diamino phosphates, etc. It is to be understood, however, that piezo-electricity forms no direct part whatever in the functioning of devices constructed according to the instant invention. The dielectrics, crystals, or ceramics of the capacitors of the instant invention are subjected preferably to a bending, twisting, or torsion, i. e., to some type of moment or couple.

It is further preferred in accordance with the instant invention to subject the capacitor to a direct voltage bias, thereby rendering the device not only more sensitive but also rendering its response more linear than it would be without any bias.

In a preferred embodiment of the invention, the entire piezo-capacitor is a combination of several individual piezo-capacitors similar to a piezo-electric bending or twisting bimorph. In this case, the capacity measuring device preferably consists of an A. C. bridge, in which two subdivisions of the "capacitive bimorph" form complementary arms. Thus as the capacity of one side of the capacitive bimorph is decreased under the influence of a given stress, the capacity of the other side increases, the algebraic sum of both changing effects being detected by the unbalancing of the bridge.

A more specific description of the instant invention will now be given in conjunction with the accompanying drawings, wherein:

Fig. 1 illustrates a piezo-capacitor subjected to a simple pressure;

Fig. 2 illustrates schematically a measuring device for detecting the capacity of such a piezo-capacitor when subjected to such a stress;

Fig. 3 illustrates a refinement of the Fig. 2 apparatus, wherein a capacitive bimorph is used in place of a simple capacitor;

Fig. 4 shows a circuit of the instant invention employing an A.-C. bridge to measure the difference in capacity of both subdivisions of the capacitive bimorph; and Fig. 5 shows a preferred circuit of the instant invention wherein feedback, either regenerative or degenerative as desired, has been introduced.

In Fig. 1, 11 designates a dielectric, such as a Rochelle salt piezoid, with two metal electrodes 12 and 13 preferably so orientated that the electric X-axis is perpendicular to the electrodes. One of the electrodes, e. g., the upper electrode 12, is pressed against the piezoid by a mechanical force illustrated by the arrow 14. In accordance with the instant invention, it has been discovered that such a mechanical pressure has a marked effect upon the dielectric constant or permittivity of the piezoid 11, and, therefore, upon the capacity of the entire piezo-capacitor. Simultaneously, the capacity depends on the potential difference between the electrodes 12 and 13 making the capacitor electrically nonlinear, as is basically well known. A third effect which must be taken into consideration in connection with the instant invention, is the piezoelectricity of the simple piezoid producing piezoelectric charges and, therefore, piezoelectric potential differences between the electrodes 12 and 13 provided they are insulated or in other words, provided the capacitor is not shunted by any parallel resistor or impedance.

Referring to Fig. 2, there is shown a simple means for making use of the discovery of the instant invention. The piezoid 15, subjected to a pressure force 16 as in Fig. 1, forms the dielectric of a capacitor 17 having the usual electrodes 18 and 19. Across the electrodes is connected any suitable capacity measuring device 20, e. g., a capacity bridge or an oscillator whose frequency is influenced by the piezo-capacitor which forms a part of the tank circuit of said oscillator. It will be understood that the capacity measuring device includes a circuit to apply a feedback voltage to said electrodes. The frequency deviations of said oscillator are proportional to the capacity of the piezo-capacitor and, therefore, to the mechanical force 16, so that they may be detected and converted into output signals by means of any frequency-modulation discriminator.

It has been found that the sensitivity of such a simple device is relatively low as long as piezoid operates in a neutral condition. However, the sensitivity, and at the same time, the linearity of its capacitive response is markedly increased by subjecting the piezo-capacitor to a unidirectional voltage bias such as may be introduced by the battery 21. This bias voltage produces a certain pre-polarization of the crystal molecular dipoles thus increasing the sensitivity, i. e., the rate of change of capacity in relation to the mechanical deformation by some orders of magnitude. Experiments have shown that the bias is desirable for the capacity-deformation effect, in other words, that the piezo-capacitor is more sensitive with a suitable bias. The additional voltage supplied by feedback acts in the same manner as bias produced by the battery. The feedback bias will, however, vary as the stress applied to the dielectric increases or decreases.

In Fig. 3, a refinement of the device is shown, wherein the simple piezo-capacitor is replaced by a capacitive bimorph. This bimorph 22 utilizes a pair of piezoids 23 and 24, cemented together with the usual intercalary electrode 25 in-between and spanned by the conventional outer electrodes 26 and 27. All these electrodes are connected to a suitable capacitance measuring device 28 indicating the difference of the capacities of the two piezoids 23 and 24. Now, the capacitive bimorph operates in push-pull. When the bimorph is subjected to a bending, the capacity of the piezoid 23 will be markedly decreased, while that of piezoid 24 is increased, or vice versa. In this manner the initial balance of both capacities becomes disturbed and the capacity measuring device 28 indicates this out-of-balance in the form of an output signal or voltage proportional to the difference of both capacities.

The bimorph 22 of Fig. 3 is very similar in construction to that disclosed in the IRE Proceedings for November 1931, in an article authored by C. Baldwin Sawyer. The phenomenon employed in the instant invention, however, has no relation to that of the Sawyer article, nor of later improvement patents, for example, 2,368,643, Crosby. In these prior uses of a bimorph, a strict piezo-electric effect is employed, wherein the bending produces a charge which is measured by a suitable circuit, or alternatively, a charge is placed upon the bimorph which produces a suitable physical bending to be used as desired. These prior art devices have the serious drawback that they are strictly dynamic in nature. When such prior art bimorphs are bent, the resulting piezo-electric charge quickly leaks off through the internal leakage of the device, so that the frequency response of such devices is markedly poor. That is to say, when used at low frequencies, or as static devices, for measuring bendings, they have no utility whatever because of the rapid disappearance of the piezo-electric charge. In contrast to these devices, the instant invention utilizes the discovery that bimorph bending produces a marked change in the capacitance of the bimorph, so that the resulting capacity of the bimorph is a unique function of the bending moment applied thereto, with the result that the apparatus of the instant invention responds faithfully at all frequencies down to zero frequency, i. e., a steady unvarying or stationary bending moment. The utilization of feedback voltage to modify capacity and thus increase or diminish response makes possible measurements of great sensitivity.

In Fig. 4 is illustrated a suitable capacitive measuring circuit, consisting of a bridge 29 having two complementary arms in the form of impedances 30 and 31. The other two complementary arms of the bridge consist of the two piezoids 32 and 33 of the bimorph 34. The midpoint 35 of the bimorph and the juncture 36 of the impedances 30 and 31 are spanned by a suitable A. C. voltmeter 37, while, in typical bridge fashion, a source of alternating or fluctuating potential 38 is connected across the two impedances 30 and 31 in series.

One end of the bimorph 34 is fixedly clamped as shown schematically at 39, while the free end is subjected to a force represented schematically by the arrow 40. The force 40 may come from a diaphragm responsive to sonic waves, from a phonograph needle, from a mass, large or small, capable of detecting acceleration, or from any other suitable quantity the magnitude of which is to be measured, and which can be translated into a force.

It will be readily apparent that the force 40 actually forms part of a bending moment in cooperation with the clamping means 39. If desired, the force 40 may be transformed into a twisting moment for applying torsion to the free end of the bimorph 34.

It has been found in accordance with the instant invention that sensitivity and linearity are greatly improved by the application of a constant volage bias across the bimorph 34, this being done in the Fig. 4 apparatus through battery 41 connected in series with the bimorph 34. Since the impedances 30 and 31 are relatively low in magnitude, it will be readily apparent that the bias 41 is, in fact, applied across both piezoids 32 and 33 of the bimorph 34 in series, because both piezoids display similar leakage resistances.

As mentioned before, the capacitive effect according to the invention is superimposed by the direct piezo effect. As a result, a fluctuating D. C.-potential arises across both outer electrodes, but only as long as there are, for the reasons mentioned before, changes in the bending force 40. In order to utilize only the desired capacitive effect according to the invention, the voltmeter 37 should indicate only the out-of-balance voltage of the A. C.-bridge or in other words, only an A. C. voltmeter should be utilized.

Another method for eliminating the direct piezo effect is revealed according to the teachings of the invention in the following manner: one of the piezoids, arbitrarily 32 or 33 may be turned over so that the direct piezoelectric voltages balance each other. This procedure does not affect the operation of the capacitive bimorph regardless of the orientation of the axis of the individual piezoids 32 and 33. In order to obtain the highest possible efficiency and linearity it may be convenient to introduce the bias voltage in the middle branch of the bridge. This arrangement discloses the basic difference from the prior uses of a bimorph as a generator of piezoelectricity.

The electric feedback to increase the sensitivity or stability of the capacitance measuring device may be produced as shown in Fig. 5 by rectifying the A. C.-output voltage of the amplifier 43 inserted in the diagonal branch of the A. C.-bridge by means of a suitable rectifier 44 and applying the entire output voltage of the latter or a portion of it in series with the bias battery 45, and hence across the bimorph. A high by-pass capacitor 46 closes the bridge for the A. C. It must be pointed out that such a feedback represents an intermixing with the original force 40 to be measured because the latter can be expressed in terms of bias voltages. This feedback may be regenerative or degenerative; in either case, it represents the application of electrical feedback to sensitize or stabilize the response from the original mechanical quantity or force.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A force measuring system comprising a bimorph including three electrodes, a pair of impedances connected in series and across the outer of said electrodes, measuring means connected between the middle of said electrodes and the junction of said impedances, a source of fluctuating voltage connected across said impedances in series, means for subjecting said bimorph to a bending moment, a source of direct bias voltage connected to apply an electrostatic bias field to said bimorph, a rectifier connected to said measuring means to derive a unidirectional voltage proportional to the bending of said bimorph, and circuit means connected between said rectifier and said bimorph to introduce a unidirectional feedback voltage across said bimorph.

2. A force measuring system comprising a bimorph including three electrodes, a pair of impedances connected in series and across the outer of said electrodes, measuring means connected between the middle of said electrodes and the junction of said impedances, a source of fluctuating voltage connected across said impedances in series, means for subjecting said bimorph to a bending moment, a rectifier connected to said measuring means to derive a unidirectional voltage proportional to the bending of said bimorph, and circuit means connected between said rectifier and said bimorph to introduce a unidirectional feedback voltage across said bimorph.

3. A force measuring system comprising a bimorph cell, a capacitance measuring circuit connected across said cell effective to measure the capacitance thereof, means for physically stressing said bimorph thereby to determine the capacitance thereof, and circuit means connected between said capacitance measuring circuit and said bimorph cell to introduce a feedback voltage proportional to stressing of said bimorph cell across said bimorph cell.

4. A force measuring system comprising a capacitor including a dielectric, a capacitance measuring circuit connected across said capacitor effective to measure the capacitance thereof, means for applying a moment to said dielectric thereby to determine the capacitance of said capacitor, a rectifier connected to said capacitance measuring circuit to derive a unidirectional voltage proportional to the moment of said dielectric, and circuit means connected between said rectifier and said dielectric to introduce a unidirectional feedback voltage across said dielectric.

5. A force measuring system comprising a bimorph cell, a capacitance measuring circuit connected across said cell effective to measure the capacitance thereof, means for physically stressing said bimorph thereby to determine the capacitance thereof, a source of direct bias voltage connected across said cell to apply an electrostatic bias field thereto, a rectifier connected to said capacitance measuring circuit to derive a unidirectional voltage proportional to the stressing of said bimorph cell, and a circuit means connected between said rectifier and said bimorph cell to introduce a unidirectional feedback voltage across said bimorph cell.

6. A force measuring system comprising a capacitor including a dielectric, a capacitance measuring circuit connected across said capacitor effective to measure the capacitance thereof, means for physically stressing said dielectric thereby to determine the capacitance of said capacitor, a source of direct bias voltage connected across said capacitor to apply an electrostatic bias field to said dielectric, a rectifier connected to said capacitance measuring circuit to derive a unidirectional voltage proportional to the stressing of said dielectric, and circuit means connected between said rectifier and said dielectric to introduce a unidirectional feedback voltage across said dielectric.

7. A force measuring system comprising a capacitor including a dielectric, a capacitance measuring circuit connected across said capacitor effective to measure the capacitance thereof, means for physically stressing said dielectric thereby to determine the capacitance of said capacitor, and circuit means connected between said capacitance measuring circuit and said dielectric to introduce a feedback voltage proportional to stressing of said dielectric across said dielectric.

HANS E. HOLLMANN.

REFERENCES CITED

The following references are of record in the file of this patent:

UNITED STATES PATENTS

| Number | Name | Date |
|---|---|---|
| 2,157,665 | Hollmann | May 9, 1939 |
| 2,306,555 | Mueller | Dec. 29, 1942 |
| 2,377,869 | Elliott | June 12, 1945 |
| 2,473,556 | Wiley | June 21, 1949 |

OTHER REFERENCES

Textbook entitled "Piezoelectricity" by Cady, 1st Ed. 1946, published by McGraw-Hill Book Co., page 549.